US012591631B2

(12) United States Patent
Lam et al.

(10) Patent No.: US 12,591,631 B2
(45) Date of Patent: Mar. 31, 2026

(54) VISIBILITY APPLICATIONS

(71) Applicant: Aurascape, Santa Clara, CA (US)

(72) Inventors: Ho Yu Lam, Santa Clara, CA (US);
Xin Luo, Fremont, CA (US); Shayan Sadigh, Santa Clara, CA (US)

(73) Assignee: Aurascape, Santa Clara, CA (US)

( * ) Notice: Subject to any disclaimer, the term of this patent is extended or adjusted under 35 U.S.C. 154(b) by 0 days.

(21) Appl. No.: 19/214,951

(22) Filed: May 21, 2025

(65) Prior Publication Data

US 2025/0363180 A1     Nov. 27, 2025

Related U.S. Application Data

(60) Provisional application No. 63/650,247, filed on May 21, 2024.

(51) Int. Cl.
*G06F 16/955* (2019.01)
*G06F 16/958* (2019.01)
*H04L 9/40* (2022.01)

(52) U.S. Cl.
CPC .......... *G06F 16/955* (2019.01); *G06F 16/958* (2019.01); *H04L 63/1416* (2013.01); *H04L 63/1425* (2013.01)

(58) Field of Classification Search
CPC .............................. G06F 16/955; G06F 16/958
See application file for complete search history.

(56) References Cited

U.S. PATENT DOCUMENTS

| | | | |
|---|---|---|---|
| 2015/0082326 A1* | 3/2015 | Milliron ................. | G06F 9/542 719/318 |
| 2017/0250930 A1* | 8/2017 | Ben-Itzhak .......... | G06F 3/0488 |
| 2019/0172073 A1 | 6/2019 | Wiig et al. | |
| 2019/0373071 A1* | 12/2019 | Ramachandran ..... | H04L 67/306 |
| 2020/0153855 A1* | 5/2020 | Kirti ...................... | H04L 63/20 |
| 2021/0218721 A1* | 7/2021 | Munro ............... | H04L 63/0876 |
| 2023/0319106 A1 | 10/2023 | Rozzo et al. | |
| 2024/0039954 A1 | 2/2024 | Shete et al. | |

OTHER PUBLICATIONS

International Search Report and Written Opinion in International Application No. PCT/US2025/030394, mailed on Jul. 21, 2025, 11 pages.

* cited by examiner

*Primary Examiner* — Esther B. Henderson
(74) *Attorney, Agent, or Firm* — Fish & Richardson P.C.

(57) ABSTRACT

Methods, systems, and apparatus, including computer programs encoded on computer storage media, for a visibility application. In some implementations, a computer system obtains data transmitted between a client device and a remote platform in a transaction and identifies at least one correlation key in the data. Based on the correlation key, the computer system associates the transaction with one or more other transactions having the correlation key. The computer system presents a user interface in which detected traffic associated with multiple different application programming interfaces (APIs) is grouped based on a common platform of the multiple different APIs and the computer system includes a knowledge graph indicating the association between the transaction and the one or more other transactions.

19 Claims, 5 Drawing Sheets

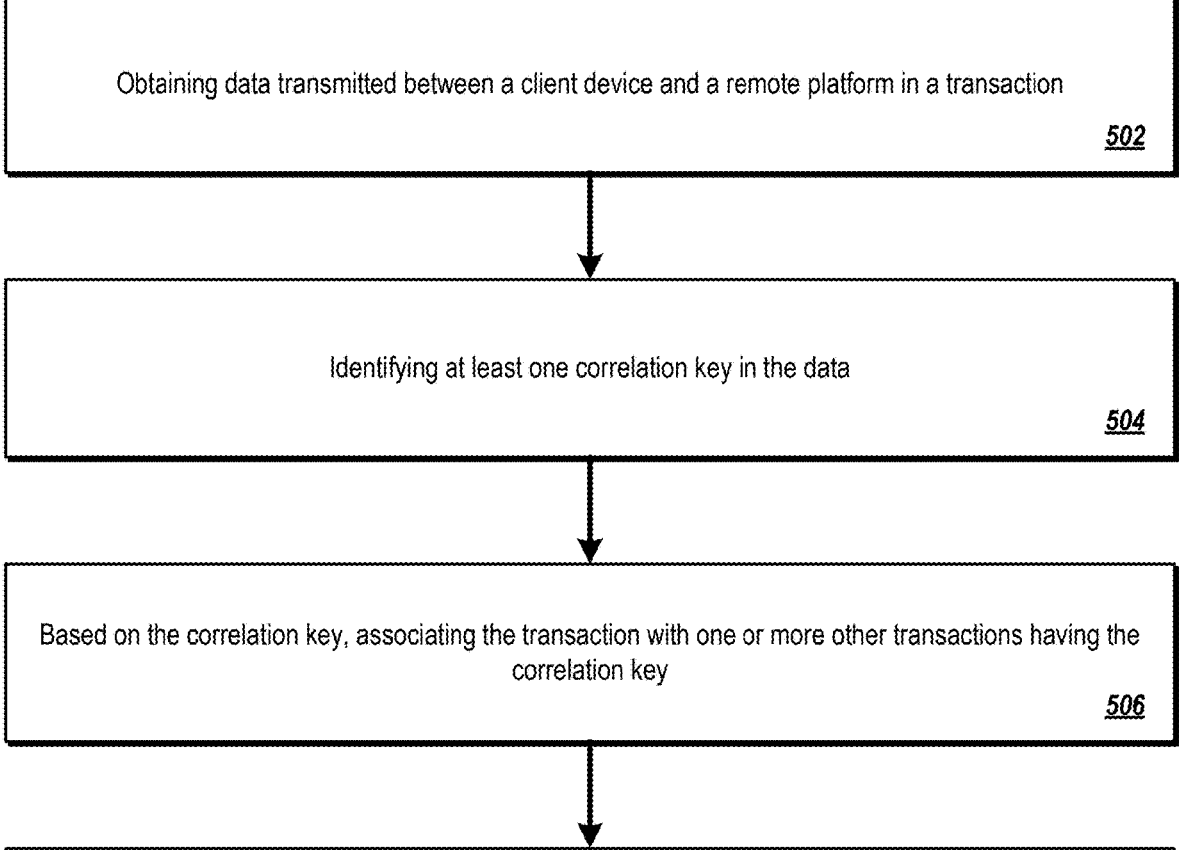

Obtaining data transmitted between a client device and a remote platform in a transaction

_502_

Identifying at least one correlation key in the data

_504_

Based on the correlation key, associating the transaction with one or more other transactions having the correlation key

_506_

Presenting, in a visibility application, a user interface in which detected traffic associated with multiple different application programming interfaces (APIs) is grouped based on a common platform of the multiple different APIs, wherein the visibility application comprises a knowledge graph indicating the association between the transaction and the one or more other transactions    _508_

FIG. 5

VISIBILITY APPLICATIONS

CROSS-REFERENCE TO RELATED APPLICATIONS

This application claims the benefit of U.S. Provisional Application No. 63/650,247, filed on May 21, 2024, which is incorporated herein by reference.

TECHNICAL FIELD

This disclosure relates generally to visibility applications.

BACKGROUND

In computing environments, organizations often rely on a wide variety of applications across various platforms to gain visibility into application usage. However, existing solutions may offer individualistic application insight or siloed insights. These types of insights can limit the ability of developers or others to monitor application behavior in real time, enforce policies, and perform actionable operations.

SUMMARY

In general, a local computer system can display information related to the monitoring of local applications. The local computer system can execute a visibility application that monitors the local applications. For example, the visibility application can include application visibility applications and uniform resource locator (URL) visibility applications, which can provide monitoring of system and/or network activities. These applications can identify activity of locally executing applications, display visualizations related to the locally executing application, and, in some cases, respond to the detected activity in an application-aware manner. More specifically, the visibility applications may allow for enforcement of polices in response to detecting activity in an application-aware manner.

In one general aspect, a method is performed by a server. The method includes: obtaining data transmitted between a client device and a remote platform in a transaction; identifying at least one correlation key in the data; based on the correlation key, associating the transaction with one or more other transactions having the correlation key; and presenting, in a visibility application, a user interface in which detected traffic associated with multiple different application programming interfaces (APIs) is grouped based on a common platform of the multiple different APIs, wherein the visibility application comprises a knowledge graph indicating the association between the transaction and the one or more other transactions.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the correlation key includes at least one of a message identifier, a file identifier, a uniform resource locator (URL), an internet link, a token, a partial URL path, a URL parameter, a header value, a Hypertext Transfer Protocol (HTTP) header value, a cookie, a data field, a value in a key-value pair, or a key in a key-value pair.

In some implementations, the correlation key further includes an off-band or assigned identifier not found in the data, the off-band identifier generated from one or more external sources based on one or more characteristics associated with the data.

In some implementations, the transaction is based on interaction with an element of the remote platform embedded in a website or application of a second platform distinct from the remote platform, and the method includes determining an identity of the second platform, and presenting a visualization of the transaction in which the transaction is associated with the second platform.

In some implementations, the element includes an embedded chatbot.

In some implementations, the method includes: monitoring a user interface of the client device as the client device triggers the transaction; and associating content in the user interface with at least one of the correlation key or the remote platform.

In some implementations, monitoring the user interface of the client device further includes: generating tracking data associated with the client device triggering the transaction; generating one or more correlations by tracking a sequence of events between the client device and the remote platform using the tracking data; and assigning the tracking data to each event of the one or more correlations associated with the sequence of events.

In some implementations, the method includes identifying the at least one correlation key based on a type of the data.

In some implementations, the method includes enforcing a policy on the data based on the association.

In some implementations, enforcing the policy includes at least one of logging an event associated with the data, blocking inline traffic comprising the data, masking, enforcing access control for the data, or enforcing permissions associated with the data.

In some implementations, the data is data of a first application, and wherein enforcing the policy includes: based on the association, determining a dependency of the first application on a second application or an application programming interface (API) endpoint; and automatically allowing traffic of the second application or the API endpoint based on the dependency.

In some implementations, the correlation key corresponds to a website or application, and wherein the method includes: based on the association, grouping the website or application into a content category.

In some implementations, the website or application is a child of a parent website or parent application, and the content category is different from a content category of the parent website or the parent application.

In some implementations, the method includes: receiving, by the visibility application, data indicating a user interaction with the association between the transaction and the one or more other transactions through a user interface; generating, by the visibility application, a modification to a policy for the association between the transaction and the one or more other transactions, wherein the modification to the policy for the association comprises at least one of a cancellation of the policy for the association or a change to one or more actions associated with the policy; storing, by the visibility application, the generated modification to the policy; and providing, by the visibility application, a notification through the user interface of the visibility application indicating the modification to the policy for the association.

In some implementations, the method further includes determining a content-based categorization of an application or website based on automated inspection of at least one of content in pages of the application or website, content in data transactions of the application or website, or content in events associated with the application or website.

The details of one or more implementations of the subject matter of the disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow chart that illustrates an example process performed by the visibility applications.

Like reference numbers and designations in the various drawings indicate like elements.

DETAILED DESCRIPTION

Figure 1:
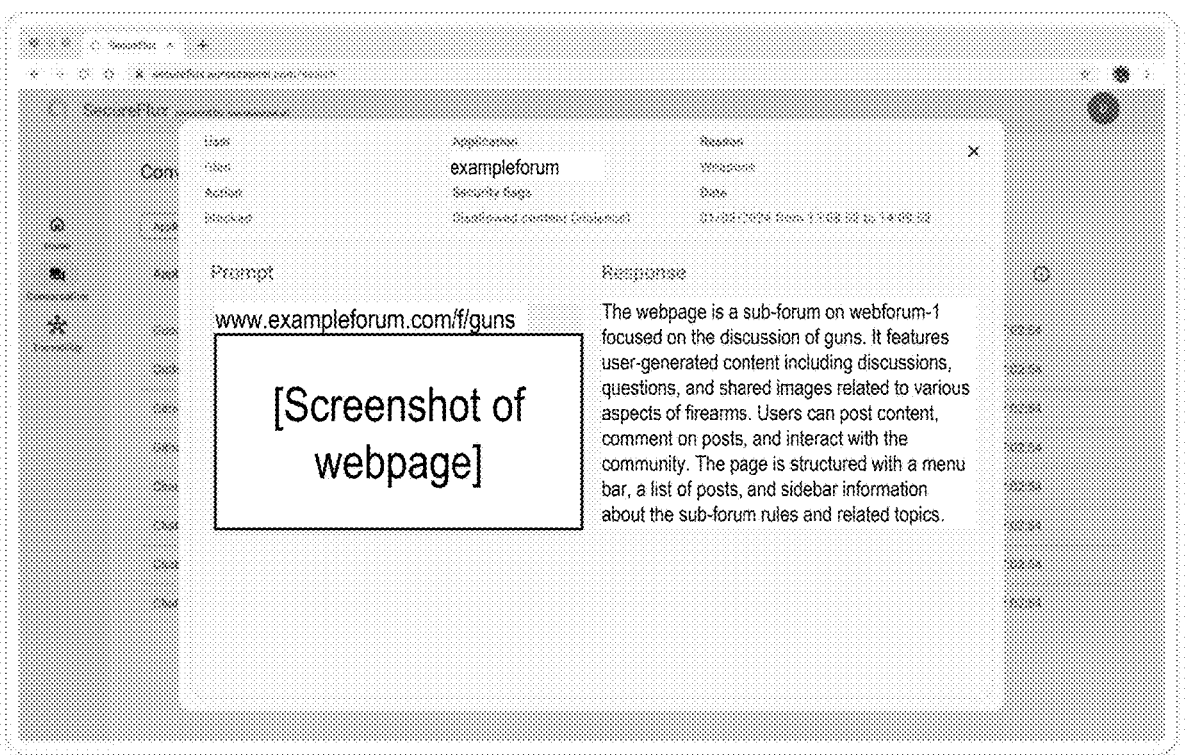
FIGS. 1-3 show examples of user interfaces of a visibility application

Existing URL and application visibility applications may display URL categories and application names, as identified in traffic or logs, in a table or list. However, for purposes of this disclosure, it has been recognized that modern applications and websites may be associated with more than one server or application programming interface (API) endpoint. For example, different servers and/or APIs may be used to provide different functionalities in a webpage or application. For example, launching an email application may result in hundreds of network transactions to many different servers. However, these network transactions all originate in the launching of the application, and it may be preferable for the transactions to all be correlated to that operation/intent for purposes of network traffic analysis and application visibility. If the network transactions or API calls are all displayed separately, the overall visibility may be too noisy and verbose to be useful to end-users. Further, display of all transactions/API call types in the same level/layer may elide relevant distinctions, such as distinctions between backend API calls and main application traffic.

Moreover, improved correlation of data between sources and applications can provide more relevant data. For example, different versions of a chatbot (e.g., a generative AI-based chatbot) may be embedded in many different web pages to provide various different functions such as virtual assistant. The use of any of these chatbots may result in corresponding data exchange with servers and APIs of the chatbot's platform, e.g., to provide prompts and receive resulting output. However, in some situations, it may be useful to know not simply that a user is engaging with the chatbot but also that the user is engaging with the chatbot on a particular website or in a particular platform different from the chatbot's platform. Some implementations of the visibility applications described herein can use correlations between data to determine, for example, the websites and/or platforms from which users access services, such as chatbots, of other platforms.

Some implementations according to the present disclosure include visibility applications that provide improved network traffic visualization, data storage visualization, offline data, activity log visualization of one or more applications, categorization, and/or correlation, for improved usefulness to users and/or improved effectiveness in responding to traffic.

In conventional systems, presenting a large amount of information on a graphical user interface may overwhelm users, such is in areas where screen size, processing power, and/or attention spans are constrained. Simply listing information on a graphical user interface in a static manner requires users to engage in manual reviewing of network traffic. However, the techniques described in this present disclosure can dynamical present information through a visibility application that present information related to a real time or substantial real time use of one more applications, including their network traffic, offline data, activity log, and other information. For instance, the visibility application can prioritize and display content related to the application based on factors pertinent to the applications' functions. Unlike generic user interfaces, the visibility application can selectively display network traffic of an application through processing flows, colors, and emphasis to easily guide the user's attention to view an application, events, and dependencies of applications. Moreover, the visibility application allows for users to view which application in the dependencies are blocked and which are allowed. This allows users to quickly identify network transactions of a particular application, minimizes interaction steps by the user needed to understand how the particular application operates, and can do so within a single window. Furthermore, the visibility applications adapts to real-time changes and allows for human feedback, that enables a user to interact with user interface. For example, a user can create or modify a policy associated with a detected event on the visibility application to enforce the policy going forward. This results in an improvement not only to the device itself but an improvement to the way the real-time or substantial real-time information is presented to the user on computer systems. Consequentially, the visibility application improves navigation for a user, allows for easier interpretation, emphasizes more relevant information over others, and enables users to more effectively interact with devices and ascertain more information with less interactions.

A visibility application can execute in one or more computer systems. For example, a visibility application can execute in the cloud as a cloud-based application, can execute on a user device or on a local computer system that receives/transmits traffic for monitoring by the visibility application, and/or can otherwise execute on various user equipment, servers, and computing systems. A visibility application can be an inline platform that monitors/intercepts data transmitted through the visibility application, and/or can be an out-of-band security platform. Although platforms described herein are referred to as "visibility" applications, a visibility application need not include visualization aspects but rather, in some implementations, can perform operations such as applying access policies and filtering data/content without having a visualization function.

In some implementations, a visibility application can be configured to perform one or more of at least the following tasks:

Application Identification: In some implementations, the visibility application can determine/identify and, in some cases, present an application's name, type, characteristics, etc. Once identified, the name, type, characteristics, and/or other attribute can be used by the visibility application to apply access policies. In some implementations, the application identification includes determination of (and, in some cases, presentation of) nested representation or lists of an application, where the different layers correspond to different application functions. For example, a top layer can include the main application and its associated attributes. The nested layers can include the API endpoints that this application utilizes, and their various associated operations and intents.

Webpage Categorization: In some implementations, a URL, HTTP, or other webpage is assigned to a category based on its contents, correlation between network activity, and/or other factors. The categorization can be used for visualization and/or for filtering policies. In some implementations, the visibility application can present a nested or graph representation of websites (e.g., URLs) with parent and child relationships therebetween. For example, for URLs, the graph can include not only associated or dependent API endpoints, but also, or instead, assets hosted in other URLs.

The categorization need not rely on, or only on, inheritance. For example, a webpage (e.g., "exampleforum") may host many sub-forums dedicated to specific topics. In the absence of content-aware/correlation-aware categorization tracking, example forum may be categorized as "forum," and the sub-forums may inherit that same categorization. However, in practice, each of the sub-forums may relate to particular topic(s) and may be more effectively categorized according to its content. For example, a "cats" sub-forum may relate to pets, while a "guns" sub-forum may relate to firearms. Categorizing both of these sub-forums as simply "forums" ignores potentially-important differences in content and may lead to less-effective filtering and content access monitoring.

Some implementations according to the present disclosure can provide categorizations based on content and/or correlations between network traffic. The categorizations can be human-input and/or based on machine learning, e.g., one or more machine learning models that execute in the visibility application to categorize webpages and their corresponding network activity.

For example, FIG. 1 illustrates an example of a user interface that may be presented by a visibility application, according to some implementations of the present disclosure. The user interface of FIG. 1 indicates that the sub-forum "www.exampleforum.com/f/guns" is categorized as related to "weapons." A user attempt to access the sub-forum was blocked in accordance with rules prohibiting access to violence-focused webpages. The user interface further includes a machine learning-generated summary of the sub-forum, e.g., generated using a large language model (LLM) and/or generative artificial intelligence (genAI). The "prompt" to the machine learning model can be an image of the webpage and/or the webpage itself, and the "response" can be used as a description/summary of the webpage. In some implementations, the "response" is used for, indicates, and/or includes the content-aware categorization.

In some implementations, context-based correlation keys, discussed in more detail below, can be used for classification of URLs and applications. The correlation keys can include, for example URLs or portions thereof, header elements, and/or other data types. For example, in the case of FIG. 1, based on a deep content-based analysis, "/f/guns" or a corresponding element can be used as a key for storing subforum classification, e.g., instead of only using a key corresponding to "exampleforum.com". As another example, the entire URL "www.exampleforum.com/f/guns" or a corresponding element can be used as a key. These keys can be used for classification, e.g., instead of being restricted to inheritance-based classification based on the parent page or parent domain. Generally, keys and methods can be made context- and content-aware for indexing and/or storing application, URL, and website categories.

Also the way we use extracted context-based keys such as parts of the URL, or other headers or parameters for classification of URLs and application (after deep content-based analysis, we choose to use /f/{subforumname} as the key for storing subforum classification instead of just one forum based on the Domain, or storing classifications on unique full URLs), and instead of blindly inheriting from a parent page or domain. Basically context and content aware (intelligent) selection of keys or methods for indexing or storing Application and URL or Website categories.

Correlated visibility: In some implementations, based on an event or sets of multiple events (e.g., an observed URL visit, an observed application transaction, transmitted and/or received data/content, etc.), the visibility application can be configured to display a trace or knowledge graph that correlates across transactions, events, and/or applications. This can include, for example, login events, sources, and/or events that led to the current event; statistics on each of the events across multiple instances and applications, etc. (e.g., an aggregated view of the knowledge graph with various grouping criteria); and/or an individual event-centric view with a graph of its associated/correlated events and transactions upstream and downstream.

Figure 2:
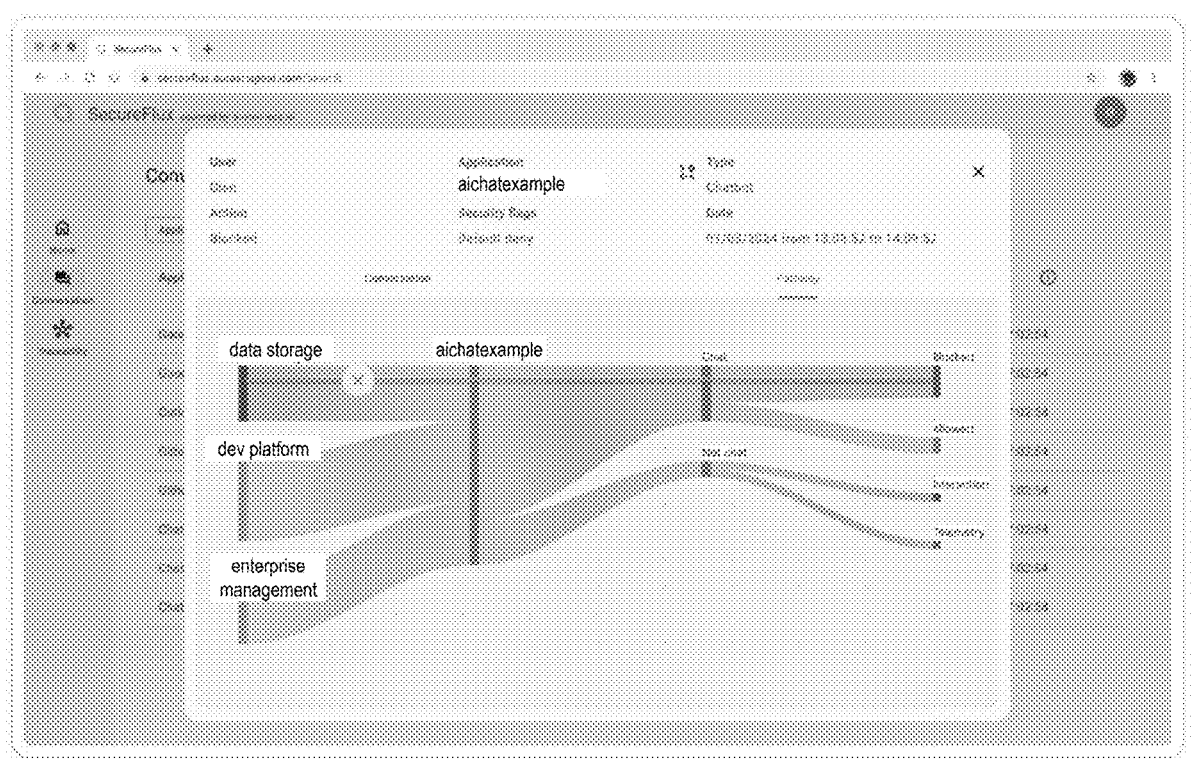

An example of a correlated visibility presentation is shown in FIG. 2. The illustrated user interface shows upstream and downstream access to a chat application "aichatexample," to which access was blocked in a policy enforcement event. URLs, API endpoints, etc., associated with "aichatexample" have been accessed from three sources, including data storage, development platform, and enterprise management. The access has corresponded to blocked chats, allowed chats, interactions, and telemetry. Data illustrated in the graph can be determined using, for example, cross-correlations, as discussed below.

In-depth content and context-based correlation: In some implementations, when an event, transaction, message, communication, or other type of data contains content or payloads that may be relevant for purposes of visibility, monitoring, etc., the visibility application can decode the data and extract the content or payload for use in categorization, visualization, etc. For example, the content can be the prompts and responses in a chatbot from a first application that is embedded in a second application. The extracted chatbot conversation can be correlated to and, for example, shown as relevant or related when a user of the visibility application views events from the chatbot application and from the second application.

According to some implementations of the present disclosure, a monitoring system of a visibility application can operate in an "active mode" or a "passive mode." In the active mode, the visibility application actively performs various operations on an application or on a website, and/or obtains data indicative of content presented on the application or website as a user uses the application or website. For example, the visibility application can (e.g., using an automated interaction tool) navigate between pages on the application or website, activate functions on the application or website, etc., and obtain corresponding content presented in the application or website. Alternatively, or in addition, the visibility application can view the pages and obtain the content as a user navigates between pages and activates functions. For example, in some implementations, the visibility application can obtain screen captures of users' displays. Further, the visibility application can obtain transmitted data resulting from performance of the operations and record characteristics of the data. The visibility application can monitor various system and/or network events that occur during these operations and thus obtain known, labeled data for correlation between operations, intents, and various system events (e.g., file accesses, domain name system (DNS) queries, etc.), and network transactions.

For example, when a function of a website or application is activated on a user device, the user device can receive data from a remote server and/or send data to the remote server. The visibility application can obtain the received and/or sent data and can determine the identity of the remote server, and can correlate the function, the data (e.g., keywords and/or other characteristics of the data), and the identity together, providing more useful visibility information.

In the passive mode, the visibility application monitors communications to obtain data, traces, or events (collective referred to as signals) collected from one or more systems. For example, the visibility application can obtain the data transmitted between the received and/or sent data in the foregoing example, and may not (in the passive mode) obtain images or content presented in the corresponding website or application, and may not (in the passive mode) obtain direct, known data about the corresponding function that triggered the data transfer. In the passive mode, the visibility application can perform real-time analysis and/or asynchronous analysis of those signals as they become available, and/or can perform the analysis on-demand, to identify relationships between the signals. The signals can be emitted from various systems in the cloud, at endpoints (e.g., laptops, servers, etc.), through an inline networking device operated by the visibility application, and/or through network infrastructure such as other firewalls, software as a service (SaaS) telemetries, etc.

The following are several examples of components and functions that can be included in a visibility application, according to some implementations of the present disclosure.

Content identification and extraction: The visibility application can identify transfers of data (e.g., having common data formats) and type of content (e.g., content in the common formats). Examples of data formats parsable by the visibility application can include HTML, JavaScript, HTTP headers (e.g., host, URL, cookies, authentication tokens, user-agent, etc.), JSON, XML, ProtoBuf, etc. These and/or other data types can be in requests and payloads, e.g., exchanged between client-side devices/applications and corresponding web servers, APIs, etc. The visibility application can obtain the data by intercepting the data as an inline platform, and/or can obtain previously-stored/archived data.

The visibility application can identify and/or infer key-value pairs from the data that are relevant for correlation, content, and context recording. Correlation can be across transactions, across network sessions, across application sessions, and/or across different applications.

For example, using an Auth Token, the visibility application can correlate an application session to a Single Sign On (SSO) application, and subsequently associate the application session (and content/activities associated therewith) with information on a particular user from the SSO. From the SSO, the visibility application can further identify whether the user is an internal user, the user's department and group membership, access privileges, organization reporting structure, etc.

As another example, when a user or the visibility application accesses a webpage, the webpage responses contain HTML, JavaScript, and/or other syntax that indicates additional assets that will be downloaded by the accessing client. A network-based component of the visibility application can see both the original HTML requests and responses, and the subsequent transactions that download assets (e.g., JavaScript, HTML, images, media, etc.) from the same server and/or from different servers and API endpoints. One, some, or all of the various servers, API endpoints, content of the HTML requests and responses, and content of the assets can all be correlated with one another by the visibility application.

As an example, a website of Platform A can include an embedded chatbot from a Chatbot Platform, the platforms distinct from one another. The main page of the website of Platform A may include links to download JavaScript and image assets from API endpoints and Content Delivery Networks (CDNs) of the Chatbot Platform. Based on loading of the webpage, the visibility application can observe/obtain network transactions to servers of Platform A and the Chatbot Platform. Because the Chatbot Platform, as a third-party vendor, deploys servers that serve more than one tenant/customer at a time, the transactions to the Chatbot Platform contain tenant identification information. The visibility application can extract the tenant identification information to facilitate correlation between the applications and transactions. Moreover, the transactions can be classified by their content.

When an end user interacts with the Chatbot Platform (e.g., by sending a message or prompt) on the website of Platform A, the visibility application can decode and record the traffic from the client to the Chatbot Platform for deep inspection and visibility. In addition, the visibility application can correlate data of the traffic with Platform A in addition to correlating the data with the Chatbot Platform. To a user of the visibility application (e.g., a security or network administrator), the visibility of sending data to the Chabot Platform deployed in service to Platform A may be more useful than only knowing that data has been sent to the Chatbot Platform. For example, given that the Chatbot Platform may be a popular embedded chatbot service deployed on many websites, a network device will observe Chatbot Platform-associated traffic deployed in service to many different companies and platforms. Merely knowing that Chatbot Platform-related traffic exists may not be useful unless the visibility application also provides data about which platform (E.g., Platform A, or another platform) that traffic is for. In addition, this data can be useful for enforcing targeted policies with specific partnered companies/platforms (trusted) compared to other companies/platforms (untrusted), for example.

For example, a policy may cover part of a correlated application/transaction set. For example, a policy may dictate that the only permitted chatbot is the ChatBot Platform, except when a chatbot is hosted on behalf of a trusted partner, e.g., embedded in a website or application of trusted partner Platform B. In that case, correlations between chatbot traffic and the corresponding websites/applications on which the chatbot is embedded can be used to determine whether to permit or block chatbot traffic.

Context-based correlation key identification: In some implementations, the visibility application can identify various correlation keys. For example, in an email application, during the email message composition operation, an email message ID is typically generated. During the email drafting process, numerous network events are observed during auto-save operations without active user action other than composing the email. These network events may contain the same email message ID so that the API endpoints performing the autosave can uniquely identify the email for the ongoing and subsequent email drafting, sending or deletion operations. Use of the email message ID by the visibility application, as a correlation key, can allow the visibility application to correlate the content of the email, the recipient of the email, the email sender, and/or other associated data with one another. These correlations can be reflected in presentations by the visibility application to users and/or in operations (e.g., data filtering, etc.) operations performed by the visibility application and/or other application(s).

Figure 3:
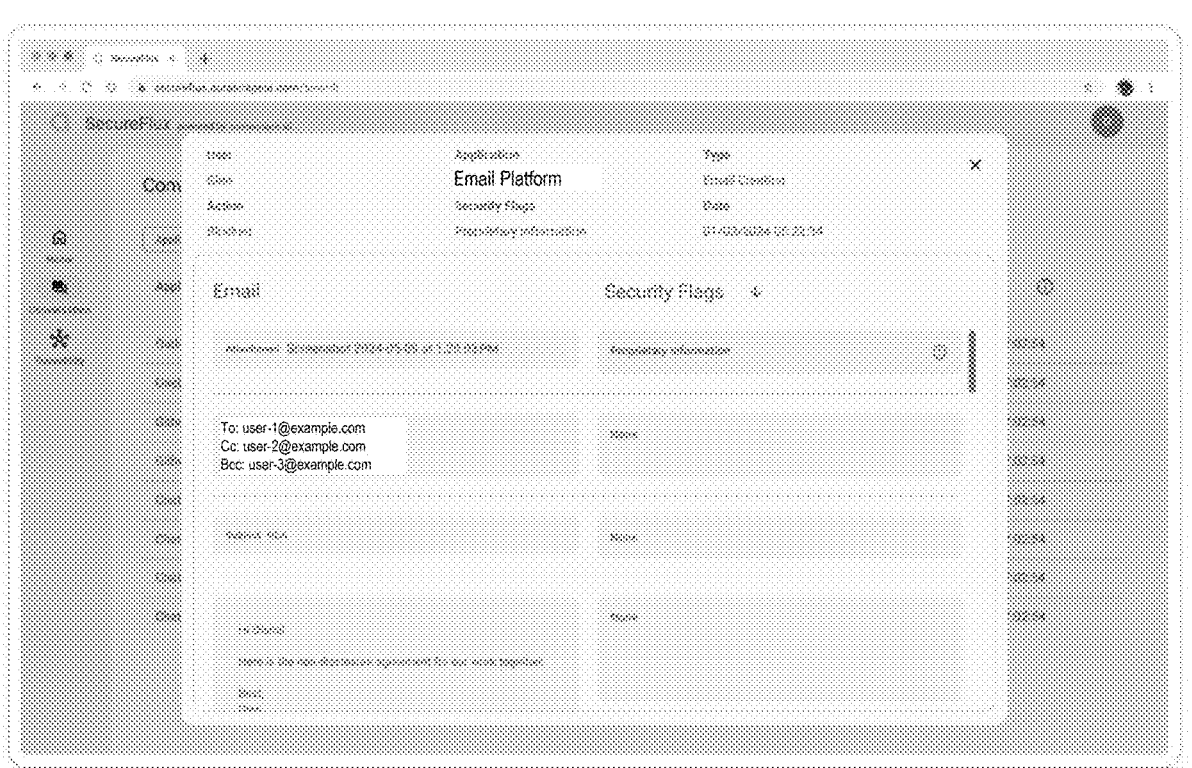

FIG. 3 illustrates an example of a user interface that can be presented by a visibility application, according to some implementations of the present disclosure. The user interface represents the detection of proprietary information in an attempted email transmission.

For example, in the user interface shown in FIG. 3, the email illustrated on the left-hand column includes an attachment of a screenshot with a timestamp. The visibility application detected that the attachment in the email contains "Proprietary information", indicated by the right hand column shown in FIG. 3. In some cases, the user interface in FIG. 3 can also show other designations, e.g., whether an email address corresponds to a restricted user or blacklisted user, both indicating that the email address cannot be sent emails. Other examples are also possible. Instead of the attachment, the visibility application may detect proprietary information in the body of the email, in the subject line, in the To line, the CC line, the BCC line, or in one or more attachments. This may be the case if the email includes proprietary information such as, for example, social security numbers, financial information, API keys, and other confidential information.

Continuing in reference to the email example, in typical email platforms, a user can choose to attach a file as an email attachment natively, or by including the attachment as a link to a cloud-based storage platform such as Google Drive or Microsoft OneDrive. In the case where the cloud-based storage is used, the user is interacting with the email application, but the email application may launch API calls to API endpoints of the cloud storage platform. For example, the API calls may include separate calls for the following functions: to authenticate; to obtain a unique identifier for uploading a file for email attachment; to set the correct permissions and location in the storage backend; to obtain a link for uploading the file to the storage application; and to upload the file and obtain a publicly accessible link for inclusion in the email body.

Through these transactions, in the context of cloud storage-based email attachments, the visibility application can use, as correlation keys, the file-id of the attachment and the URL/links used during transactions between the email client and the cloud storage backend.

For visibility to a user of the visibility application, the visibility application can extract data-specific or application-specific fields. For example, in the case of an email in an email application, the visibility application can extract email-specific fields. For example, for correlation in the backend, the visibility application can extract the Email Message ID, userid, and/or mailbox identities. For an online email application, the email platform's server may be constantly updated with new data (e.g., autosave data) as a user edits the email, and data (e.g., Message ID and/or content) of these updates can be used for correlation. As a result of these and/or other correlations, the visibility application can present activity data in a decluttered manner that aggregates/deduplicates content that belongs to the same user-perceived session or set of operations (in this example, aggregation into one event representing the editing of the same email, compared to a flat list/table of all the individual autosaves over the duration of editing the same email.)

Transaction and event association from inline and/or offline data: As discussed above, in some implementations, an active monitoring system of a visibility application can observe a human user performing operations using an application or on a website. The monitoring system can observe how the user interacts with the application, record the associated network and/or system events and transactions, and classify and correlate those events with the observed operations and intents.

Alternatively, or in addition, an AI agent can guide the monitoring system to perform action(s) on an application or website autonomously. For example, the AI agent can perform different actions based on the classification of the current page or application interface, and can determine the next-available operations and actions. The AI agent can be provided with a set of goals such as identifying potential actions that may send sensitive information out, or actions that may reveal user information such as login, etc., and the operations performed by the AI agent in the application or website can be determined based on the goal(s).

In some implementations, in the passive operating mode, a passive monitoring system of the visibility application can collect and aggregate data, telemetry, logs, etc., from one or more of various types of systems, such as a proxy, security system, endpoint agent, network switches and router, cloud services telemetry, DNS proxy, etc. Correlations can be determined from this collected data. For example, from HTML in an HTTP response captured by a proxy, URLs referenced in the HTML could be found and used for correlations, e.g., with other data, websites, applications, etc., that include or are associated with the URLs. For example, the URLs can be matched against other HTTP transactions in the proxy and/or security system logs, or endpoint agent logs, etc.

A trace or graph (e.g., a knowledge graph) of related operations can be established to correlate multiple transactions based on their common content. By performing deep analysis of a JavaScript fetched due to HTML in a collected transaction, in some implementations, the visibility application can identify additional DNS requests, backend API calls to a certain API endpoint, and/or the like. This can allow the visibility application to correlate one or more particular backend APIs with the HTML. Moreover, the detection of DNS requests or additional DNS requests allows for the visibility application to predict future traffic, as the DNS requests is a precursor to future traffic that may be sent and/or received, such as in upstream or downstream traffic. This information can be used to correlate subsequent network events, endpoints, detected asset downloads, and/or the like.

Natural implicit policies on required dependencies for an application to function, e.g., for policy enforcement: In some implementations, when an application depends on other applications, protocols, and/or API endpoints to provide its intended functionalities, these dependencies can be discovered implicitly by the visibility application, e.g., based on analysis of monitored traffic between the application and the other applications, protocols, and/or API endpoints. The visibility application can be configured to automatically allow the other applications, protocols, and/or API endpoints based on which an allowed application depends. In some cases, the visibility application may also deny the other applications, protocols, and/or API endpoints based on which an allow application depends and one or more policies that enforce the restriction or prevention of those specific applications. Policies can be enforced/executed by the visibility application based on the dependencies, e.g., by focusing policies on the main applications and/or main operations/intents. In some cases, an administrator or user can interact with the visibility application through the user interface that allows for the other applications to be allowed or denied, manually. Accordingly, a web of dependencies need not be manually maintained through manual research and incidence responses, e.g., in some cases without requiring an administrator to explicitly and manually allow applications and API endpoints that are depended upon.

Correlated visibility for troubleshooting: In some implementations, when an application or webpage is blocked (e.g., when a required backend APIs is blocked), or an application or webpage appears to not be functioning properly, the use of correlated visibility can make the issue easier to troubleshoot. For example, if a development application is not functioning correctly, the visibility platform may display information indicating that a backend API on which the development platform depends has been blocked. An administrator can correspondingly allow the backend API, such as by selecting the backend API has been blocked through the visibility platform and instructing the visibility platform to unblock the backend API. In some cases, the administrator can perform a similar process of unblocking or blocking other applications depending on their current status through the visibility platform. In some cases, as discussed above, the backend API may be automatically allowed by the visibility application based on the identified correlation between the backend API and the development platform.

In some implementations, a user can interact with various portions of the visibility application through the visibility presentation. For example, a user may select one or more portions of the visibility applications through a graphical user interface, such as one or more displayed events, e.g., an observed URL visit, an observed application transaction, transmitted and/or received data/content, etc., and define one or more policies to be enforced based on those events. These events can be shown, such as in the correlated visibility presentation of FIG. 2, and allow the user to select one or more events and modify the events to define a policy. For example, FIG. 2 illustrates the "aichatexample" application blocked from communicating with data storage. The user may interact with the graphical user interface and select the "aichatexample" interaction with the dev platform and enterprise management, to block both of those communications as well. This blocking would create a policy that subsequently blocks any future communications by the "aichatexample" with the data storage, the dev platform, and the enterprise management. In this manner, the user is able to visually interact with the visibility application to selectively determine one or more events that are to fall under a policy to be enforced. In some cases, the user can interact with various portions of the visibility application for other purposes. These purposes can include, for example, to allow the event to occur, to modify a current policy, to enable telemetry data to be passed or not be passed, and configure any other policies via the user interface.

Examples of Computer Systems

Figure 4:
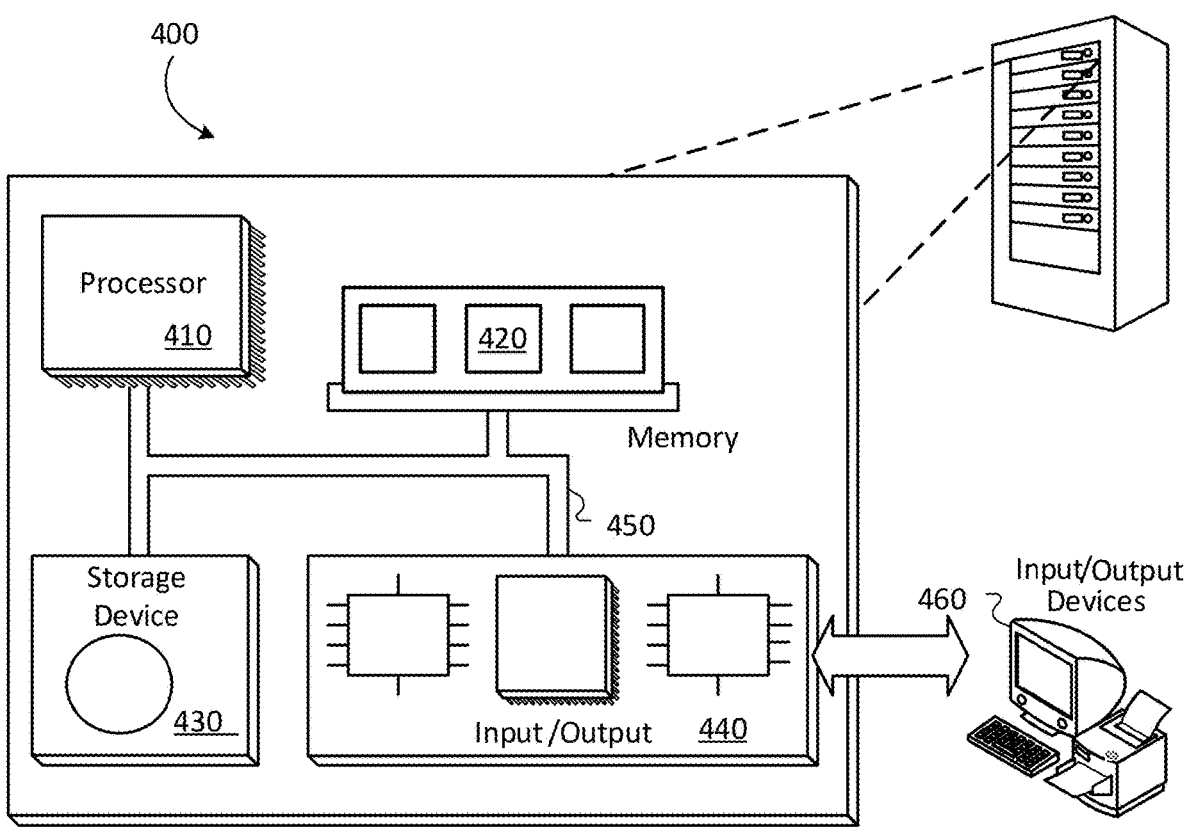
FIG. 4 shows an example of a computing system, according to some implementations of the present disclosure.

FIG. 4 depicts an example of computing system, according to some implementations of the present disclosure. The system 400 can include, be, or represent, for example, a system executing a visibility application. The system 400 may be used for any of the operations described with respect to the various implementations discussed herein. The system 400 may include one or more processors 410, a memory 420, one or more storage devices 430, and one or more input/output (I/O) devices 460 controllable through one or more I/O interfaces 440. The various components 410, 420, 430, 440, or 460 may be interconnected through at least one system bus 450, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s)

410 and the memory 420 may be supplemented by, or incorporated into, one or more application-specific integrated circuits (ASICs).

The system 400 may include one or more I/O devices 460. The I/O device(s) 460 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 460 may also include one or more output devices such as a display, LED(s), an audio output device (e.g., a speaker), a printer, a haptic output device, and so forth. The I/O device(s) 460 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 460. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

FIG. 5 is a flow chart that illustrates an example process 500 performed by the visibility applications. For example, the visibility application that can execute in one or more computer systems can perform the process 500.

The visibility application can obtain data transmitted between a client device and a remote platform in a transaction (502). For example, the visibility application can monitor communications to obtain data, traces, or events collected from one or more systems. In some cases, the transaction is based on interaction with an element of the remote platform embedded in a website or application of a second platform distinct from the remote platform. The visibility application can determine an identity of the second platform and present a visualization of the transaction in which the transaction is associated with the second platform. The element can include, for example, an embedded chatbot.

The visibility application can identify at least one correlation key in the data (504). The visibility application can identify the at least one correlation key based on a type of the obtained data. The correlation key can include, for example, a file identifier, a uniform resource locator (URL), an internet link, a token, a partial URL path, a URL parameter, a header value, a Hypertext Transfer Protocol (HTTP) header value, a cookie, a data field, a value in a key-value pair, or a key in a key-value pair. The correlation key can also include an off-band or assigned identifier not found in the data. The off-band identifier may be generated from one or more external sources based on one or more characteristics associated with the data. The one or more external sources can include an artificial intelligence model or a classifier that analyzes various characteristics. These characteristics can include data that may or may not be in the original data such as, for example, DNS queries to IP addresses, where an external source, e.g., classifier, may apply DNS/IP address mappings to the traffic to associate multiple transactions together.

In some implementations, the visibility application can monitor a user interface of the client device as the client device triggers the transaction. Additionally, the visibility application can associate content in the user interface with at least one of the correlation key or the remote platform. Monitoring the user interface can include the visibility application generating tracking data associated with the client device triggering the transaction and generating one or more correlations by tracking a sequence of events between the client device and the remote platform using the tracking data. The visibility application can assign the tracking data to each event of the one or more correlations associated with the sequence of events. For example, the visibility application can monitor the client interactions that can provide correlations by tracking sequences of events and traffic data correlations. The visibility application can then assign an identifier to the correlations, such as an action ID, for example. Here, the visibility application can observe these specific actions in multiple transactions and events and identify those actions using the action ID. Since the action ID is not part of the transaction header or data in question, the visibility application can assign an identifier to multiple transactions to allow for subsequent associations and correlations.

Based on the correlation key, the visibility application can associate the transaction with one or more other transactions having the correlation key (506). In some cases, the visibility application can enforce a policy on the data based on the association. Enforcing the policy can include, for example, at least one of logging an event associated with the data, blocking inline traffic comprising the data, masking, enforcing access control for the data, or enforcing permissions associated with the data. The data is data of a first application. The visibility application can, based on the association, determine a dependency of the first application on a second application or an application programming interface (API) endpoint. In response, the visibility application can automatically allow traffic of the second application or the API endpoint based on the dependency.

In some cases, the correlation key corresponds to a website or application. Based on the association, the visibility application can group the website or application into a content category. The website or application can be a child of a parent website or parent application. The content category is different from a content category of the parent website or the parent application.

The visibility application can present a user interface in which detected traffic associated with multiple different application programming interfaces (APIs) is grouped based on a common platform of the multiple different APIs, wherein the visibility application comprises a knowledge graph indicating the association between the transaction and the one or more other transactions (508). In some cases, the visibility application can receive data indicating a user interaction with the association between the transaction and the one or more other transactions through a user interface. The visibility application can generate a modification to a policy for the association between the transaction and the one or more other transactions. The modification to the policy for the association includes, for example, at least one of a cancellation of the policy for the association or a change to one or more actions associated with the policy. The visibility application can store the generated modification to the policy. Additionally, the visibility application can provide a notification through its user interface indicating the modification to the policy for the association.

In some implementations, the visibility application can determine a content-based categorization of an application or website based on automated inspection of at least one of content in pages of the application or website, content in data transactions of the application or website, or content in events associated with the application or website.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining data transmitted between a client device and a chatbot of a remote platform in a transaction, the transaction involving the chatbot embedded in a website or application of a second platform distinct from the remote platform;
   determining at least one correlation key in the data that identifies the transaction;

in response to determining the at least one correlation key, monitoring a plurality of other transactions of the chatbot with one or more other platforms;

based on the correlation key and the transaction, identifying a subset of other transactions of the plurality of other transactions having the at least one correlation key;

blocking one or more of the subset of the other transactions according to a policy; and presenting, in a visibility application, a user interface in which detected traffic associated with multiple different application programming interfaces (APIs) of the one or more other platforms is grouped based on a common platform of the multiple different APIs, wherein the visibility application comprises a knowledge graph indicating the association between the transaction and the subset of other transactions and data indicating the one or more other blocked transactions.

2. The computer-implemented method of claim 1, wherein the at least one correlation key comprises at least one of a message identifier, a file identifier, a uniform resource locator (URL), an internet link, a token, a partial URL path, a URL parameter, a header value, a Hypertext Transfer Protocol (HTTP) header value, a cookie, a data field, a value in a key-value pair, or a key in a key-value pair.

3. The computer-implemented method of claim 2, wherein the at least one correlation key further comprises an off-band or assigned identifier not found in the data, the off-band identifier generated from one or more external sources based on one or more characteristics associated with the data.

4. The computer-implemented method of claim 1, comprising:

determining an identity of the second platform, and presenting a visualization of the transaction in which the transaction is associated with the second platform.

5. The computer-implemented method of claim 1, comprising:

monitoring a user interface of the client device as the client device triggers the transaction; and associating content in the user interface with at least one of the correlation key or the remote platform.

6. The computer-implemented method of claim 5, wherein monitoring the user interface of the client device further comprises:

generating tracking data associated with the client device triggering the transaction;

generating one or more correlations by tracking a sequence of events between the client device and the remote platform using the tracking data; and assigning the tracking data to each event of the one or more correlations associated with the sequence of events.

7. The computer-implemented method of claim 1, comprising identifying the at least one correlation key based on a type of the data.

8. The computer-implemented method of claim 1, comprising enforcing an additional policy on the data based on the association.

9. The computer-implemented method of claim 8, wherein enforcing the additional policy comprises at least one of logging an event associated with the data, blocking inline traffic comprising the data, masking, enforcing access control for the data, or enforcing permissions associated with the data.

10. The computer-implemented method of claim 8, wherein the data is data of a first application, and wherein enforcing the policy comprises:

based on the association, determining a dependency of the first application on a second application or an application programming interface (API) endpoint; and automatically allowing traffic of the second application or the API endpoint based on the dependency.

11. The computer-implemented method of claim 1, wherein the at least one correlation key corresponds to a website or application, and wherein the method comprises:

based on the association, grouping the website or application into a content category.

12. The computer-implemented method of claim 11, wherein the website or application is a child of a parent website or parent application, and wherein the content category is different from a content category of the parent website or the parent application.

13. The computer-implemented method of claim 1, further comprising:

receiving, by the visibility application, data indicating a user interaction with the association between the transaction and the one or more other transactions through a user interface;

generating, by the visibility application, a modification to a policy for the association between the transaction and the one or more other transactions, wherein the modification to the policy for the association comprises at least one of a cancellation of the policy for the association or a change to one or more actions associated with the policy;

storing, by the visibility application, the generated modification to the policy; and providing, by the visibility application, a notification through the user interface of the visibility application indicating the modification to the policy for the association.

14. The computer-implemented method of claim 1, further comprising determining a content-based categorization of an application or website based on automated inspection of at least one of content in pages of the application or website, content in data transactions of the application or website, or content in events associated with the application or website.

15. A system comprising:

one or more computers and one or more storage devices storing instructions that are operable, when executed by the one or more computers, to cause the one or more computers to perform operations comprising:

obtaining data transmitted between a client device and a chatbot of a remote platform in a transaction, the transaction involving the chatbot embedded in a website or application of a second platform distinct from the remote platform;

determining at least one correlation key in the data that identifies the transaction;

in response to determining the at least one correlation key, monitoring a plurality of other transactions of the chatbot with one or more other platforms;

based on the correlation key and the at transaction, identifying a subset of other transactions of the plurality of other transactions having the at least one correlation key;

blocking one or more of the subset of the other transactions according to a policy; and presenting, in a visibility application, a user interface in which detected traffic associated with multiple different application programming interfaces (APIs) of the one or more other platforms is grouped based on a common platform of the multiple different APIs, wherein the visibility application comprises a knowledge graph indicating the association between the transaction and the subset of other transactions and data indicating the one or more other blocked transactions.

16. The system of claim 15, wherein the at least one correlation key comprises at least one of a message identifier, a file identifier, a uniform resource locator (URL), an internet link, a token, a partial URL path, a URL parameter, a header value, a Hypertext Transfer Protocol (HTTP) header value, a cookie, a data field, a value in a key-value pair, or a key in a key-value pair.

17. The system of claim 16, wherein the at least one correlation key further comprises an off-band or assigned identifier not found in the data, the off-band identifier generated from one or more external sources based on one or more characteristics associated with the data.

18. The system of claim 15,
wherein the operations comprise:
determining an identity of the second platform, and
presenting a visualization of the transaction in which the transaction is associated with the second platform.

19. A non-transitory computer-readable medium storing software comprising instructions executable by one or more computers which, upon such execution, cause the one or more computers to perform operations comprising:

obtaining data transmitted between a client device and a chatbot of a remote platform in a transaction, the transaction involving the chatbot embedded in a website or application of a second platform distinct from the remote platform;

determining at least one correlation key in the data that identifies the transaction;

in response to determining the at least one correlation key, monitoring a plurality of other transactions of the chatbot with one or more other platforms;

based on the correlation key and the at transaction, identifying a subset of other transactions of the plurality of other transactions having the at least one correlation key;

blocking one or more of the subset of the other transactions according to a policy; and presenting, in a visibility application, a user interface in which detected traffic associated with multiple different application programming interfaces (APIs) of the one or more other platforms is grouped based on a common platform of the multiple different APIs, wherein the visibility application comprises a knowledge graph indicating the association between the transaction and the subset of other transactions and data indicating the one or more other blocked transactions.

* * * * *